(12) United States Patent
Sahm, III et al.

(10) Patent No.: US 9,216,836 B1
(45) Date of Patent: Dec. 22, 2015

(54) PLASTIC INJECTION MOLDING AND PROCESS

(75) Inventors: Victor A. Sahm, III, Dallas, TX (US); Charles Hansen, Irving, TX (US)

(73) Assignee: Maxi-Lift, Inc., Addison, TX (US)

( * ) Notice: Subject to any disclaimer, the term of this patent is extended or adjusted under 35 U.S.C. 154(b) by 0 days.

(21) Appl. No.: 13/108,373

(22) Filed: May 16, 2011

Related U.S. Application Data

(63) Continuation of application No. 11/839,722, filed on Aug. 16, 2007, now Pat. No. 7,959,844.

(51) Int. Cl.
*B65D 1/00* (2006.01)
*B65D 1/46* (2006.01)
*B29C 49/00* (2006.01)

(52) U.S. Cl.
CPC .............. *B65D 1/46* (2013.01); *B29C 49/0005* (2013.01)

(58) Field of Classification Search
USPC ............ 428/35.7, 36.92; 264/331.15, 331.17, 264/328.1
See application file for complete search history.

(56) References Cited

U.S. PATENT DOCUMENTS

| | | | |
|---|---|---|---|
| 4,155,794 A * | 5/1979 | Raabe et al. | 156/380.2 |
| 5,589,128 A | 12/1996 | Lai et al. | |
| 6,065,633 A * | 5/2000 | Abbey | 220/501 |
| 6,746,560 B1 | 6/2004 | Humphrey et al. | |
| 2005/0037166 A1* | 2/2005 | Maziers | 428/35.7 |
| 2006/0165930 A1* | 7/2006 | Easterday et al. | 428/35.7 |

FOREIGN PATENT DOCUMENTS

EP      1357136      10/2003

* cited by examiner

*Primary Examiner* — Ellen S Wood
(74) *Attorney, Agent, or Firm* — Gardere Wynne Sewell LLP

(57) ABSTRACT

Plastic containers are described herein that are injection molded with an high density polyethylene (HDPE) blow molding grade resin having a density of about 0.960 to about 0.965 g/cc and a melt index of about 0.7 to about 1.0 g/10 min. at injection temperatures of about 570° F. to about 670° F. and mold cavity pressures of about 20,000 psig to about 27,000 psig. Relatively thin walled, rigid, containers, such as livestock feed containers, may be manufactured as described using about 20% to 50% less material while retaining strength and durability comparable to containers molded of HDPE injection molding grade resins.

20 Claims, 1 Drawing Sheet

PLASTIC INJECTION MOLDING AND PROCESS

CROSS REFERENCE TO RELATED APPLICATIONS

This application is a continuation of and claims the benefit of U.S. patent application Ser. No. 11/839,722 filed Aug. 16, 2007, the entirety of which is hereby incorporated by reference.

BACKGROUND

In the art of manufacturing molded plastic containers and the like, blow molding processes and injection molding processes have evolved. Relatively thin walled containers of a high density polyethylene (HDPE) polymer material can be blow molded using certain polymers and certain blow molding equipment. For example, HDPE polymers for blow molding consumer milk containers have a density of approximately 0.960 to 0.965 g/cc. On the other hand, relatively low to medium density polyethylene polymers (0.900 to 0.960 g/cc) are used in thicker walled, non-rigid containers such as large trashcans. HDPE grade resins for blow molding typically have a melt index of about 0.7 to 1.0 grams/10 min., whereas resins and polymers for injection molding have a melt index of about 6.0 or more grams/10 min.

In manufacturing containers for agricultural applications such as livestock feed tubs and the like, it is desirable to provide a rigid, durable container which is economical to produce and uses a minimum amount of polymer material. Those manufacturers equipped with injection molding equipment for manufacturing components/containers would benefit from being able to use a blow molding grade HDPE resin, but the expense of adding blow molding equipment to the manufacturing assets may not be warranted. Moreover, until now, the ability to use injection molding equipment to mold parts with a blow molding grade resin has not been successful, principally in part because of the low melt index and slow flow characteristics of blow molding resins. It is to these ends that the present invention has been developed.

Overview

The present invention is directed to a new and improved process for manufacturing molded plastic components, such as, for example livestock feed containers, formed of blow molding grade resins but using injection molding apparatus. In particular, the described herein is a process for manufacturing containers, such as agricultural/livestock feed containers, formed of HDPE blow molding grade resin, wherein the containers are molded using an injection molding apparatus and molding process.

In accordance with an important embodiment, the plastic injection molding process described herein allows the above and enables a reduction in the amount of material required to manufacture certain types of containers, such as livestock feed tubs, using, for example, approximately 20% to 50% less material than was previously required. In particular, containers comprising generally cylindrical or rectangular livestock feed tubs ranging in size from about 15.0 inches and to about 25.0 inches diameter or width, and by about 5.0 inches and to about 25.0 inches depth, may be manufactured by the process described herein with a wall thickness in the range of about 0.070 to about 0.150 inches. Moreover, typical HDPE molding temperatures may be maintained while injection or mold cavity pressures are raised to a range of about 20,000 psig to 27,000 psig to accomplish the molding described herein, without premature solidification of the resin in the mold. Still further, blow molding grade HDPE resins having a density in the range of about 0.958 to 0.965, and a melt index of about 0.7 to 1.00 grams/10 min., have been used with the injection molding equipment, such as described herein. Molding temperatures may be raised to a range of about 570° F. to 670° F., and injection pressures to a range of about 2000 psig to 2300 psig, without suffering premature solidification or other product defects.

Also described and provided herein are improved molded plastic containers formed of HDPE blow molding grade resin that have been molded by an injection molding process and equipment, such as that described herein, which serve as a representative example.

Those skilled in the art will further appreciate the above-mentioned advantages and superior features of the invention together with other important aspects thereof upon reading the detailed description which follows in conjunction with the drawings.

DETAILED DESCRIPTION

Figure 1:
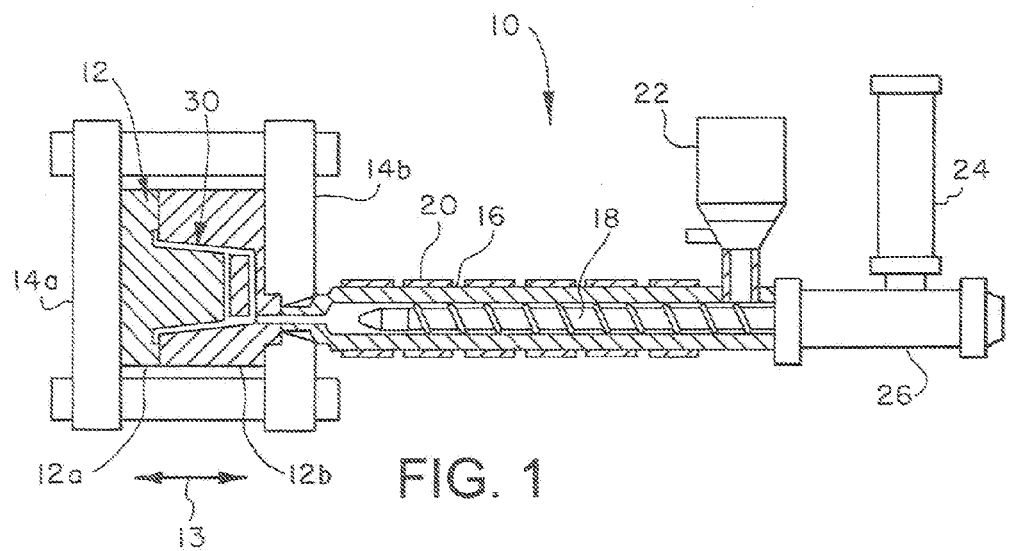
FIG. 1 is a schematic diagram of a representative injection molding apparatus used in connection with the molding process as described herein.

In the description which follows, like elements are marked with the same reference numerals throughout the specification and drawing. The drawing figures are not necessarily to scale and certain elements are shown in schematic form in the interest of clarity and conciseness.

Referring to FIG. 1, there is illustrated a schematic diagram of representative major components of an injection molding apparatus or system, generally designated by the reference numeral 10. The injection molding apparatus or system 10 may be of a type commercially available, such as a 1125 ton injection molding machine available from Cincinnati Milacron, Cincinnati, Ohio. The schematic of FIG. 1 is intended to be representative and to represent only major components of a typical injection molding system which may be utilized for carrying out the process described herein. Accordingly, in the example, the system 10 may include a two-part mold assembly 12, including opposed separable mold parts 12a and 12b disposed between clamping mechanism components 14a and 14b. The clamping components 14a and 14b may be moved toward and away from each other in the directions of arrow 13. An injection cylinder 16 is suitably connected to the mold assembly 12 and includes an injection screw 18 disposed therein. Suitable heater bands 20 are disposed around the exterior of the cylinder 16 for heating the plastic material to a melt form to be injected into the mold 12. A feed hopper 22 is provided to hold the appropriate supply of polymer pellets, which are then metered into the interior of the cylinder 16 where the pellets are heated to a fluid state for injection into the mold. An injection drive unit 26 is operably connected to the screw 18 and the cylinder 16 in a known manner, and an accumulator 24 is operatively coupled to the drive unit 26.

In accordance with the process described herein, containers are manufactured with injection molding apparatus like that of the system 10, but using pellets of HDPE resin with a material density in a range of about 0.958 to 0.965 g/cc, as distinguished from material of a density of about 0.900 to 0.955 g/cc, which is that typically associated with an injection molding grade of HDPE copolymer. Moreover, the high density polymer material used has a melt index in the range of about 0.7 to 1.0 grams/10 min.

Figure 2:
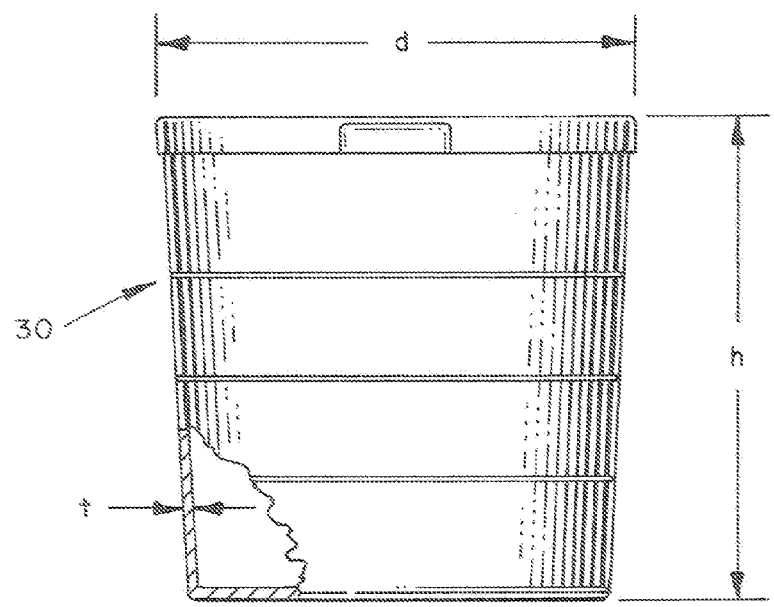
FIG. 2 is a side elevation, partially sectioned, of a representative injection molded container manufactured by the process described herein.

FIG. 2 illustrates a representative tub 30, such as a livestock feed container, which was manufactured in accordance with an injection molding process as just described and using the described high density resin material. The tub 30 is a substantially cylindrical container having a diameter "d", an overall height "h" and a wall thickness "t". More particularly, containers such as those prepared herein may have a diameter "d" in the range of about 15.0 inches to about 25.0 inches, an overall height "h" in the range of about 5.0 inches to about 25.0 inches, and wall thickness "t" in the range of about 0.070 inches to about 0.150 inches and may be produced using the injection molding process described herein. Containers such as tub 30 within said dimensional ranges have been fabricated with the described high density HDPE resin having a melt index in the range of 0.7 to 1.0 g/10 min. This is compared with injection molding HDPE resins which typically have a melt index of about 6.0 to 7.0 g/10 min. It has also been determined that using the process of this invention, a savings in resin material of about 20% to as much as 50% can be achieved.

Using the processes as described herein for manufacturing containers 30 of the heretofore described dimensions, resin injection temperatures have been raised to about 570° F. to 670° F., with injection velocities in the range of about 3.8 to 4.0 in/sec., and fill pressures in the range of about 2000 to 2260 psi. Mold cavity pressures in the range of 20,000 psig to 27,000 psig were also obtained.

Accordingly, contrary to conventional practice in which blow molding has been required for producing relatively thin walled cylindrical containers and the like, the description herein has successfully used injection molding processes for producing such thin walled cylindrical containers and products.

Although representative processes and articles have been described in detail herein, those skilled in the art will recognize that various substitutions and modifications may be made without departing from the scope and spirit of the invention as described and defined by the appended claims.

What is claimed is:

1. A method of injection molding a thin walled injection molded container with a two-part mold, the method comprising:
    injecting into the two-part mold defining all dimensions of said container using an injection molding machine a blow molding grade high density polyethylene (HDPE) resin in melt form having a melt index in a range of about 0.7 to about 1.0 g/10 min and a density in a range of about 0.958 to about 0.965 g/cc,
    such that a combination of said blow molding grade HDPE resin and injecting into said two-part mold using said injection molding machine provides the entire thin walled injection molded container having outer dimensions that include a diameter or width in a range of about 15.0 inches to about 25.0 inches, and a side wall having an overall height in a range of about 5.0 inches to about 25.0 inches, and a wall thickness in a range of about 0.070 inches to about 0.150 inches, and
    the side wall when injection molded is continuous with the base part.

2. The method of claim 1 wherein:
    the blow molding grade HDPE resin has a density in a range of about 0.958 to about 0.965 g/cc.

3. The method of claim 1 wherein:
    the blow molding grade HDPE resin is injected into said two-part mold at a temperature in a range of about 570° F. to about 670° F.

4. The method of claim 1 wherein:
    the blow molding grade HDPE resin is injected into said two-part mold at an injection pressure in a range of about 2000 psig to about 2300 psig.

5. The method of claim 1 wherein:
    the blow molding grade HDPE resin is injected at a velocity in a range of about 3.8 inches per second to about 4.0 inches per second.

6. The method of claim 1 wherein:
    the cavity pressure is in a range of about 20,000 psig to about 27,000 psig.

7. A method of injection molding a thin walled injection molded container comprising:
    injecting into a two-part mold defining all dimensions of said thin walled injection molded container using an injection molding machine a blow molding grade high density polyethylene (HDPE) resin in melt form, having a melt index in a range of about 0.7 to about 1.0 g/10 min. and a density in a range of about 0.958 to about 0.965 g/cc; and
    injecting said blow molding grade HDPE resin into said two-part mold at an injection temperature in a range of about 570° F. to about 670° F., and with a mold cavity pressure in a range of about 20,000 psig to about 27,000 psig,
    such that a combination of said blow molding grade HDPE resin and injecting into said two-part mold using said injection molding machine provides the entire thin walled injection molded container when injection molded with a diameter or width in a range of about 15.0 inches to about 25.0 inches, an overall height in a range of about 5.0 inches to about 25.0 inches, and a wall thickness in a range of about 0.070 inches to about 0.150 inches.

8. The method of claim 7 wherein:
    the blow molding grade HDPE resin is injected at a velocity in a range of 3.8 inches per second to about 4.0 inches per second.

9. The method of claim 7 wherein:
    the blow molding grade HDPE resin is injected into said mold at a pressure in the range of about 2000 psig to about 2300 psig.

10. An injection molded container molded entirely from a blow molding grade resin material while using an injection molding machine, the injection molded container obtained from a two-part mold having a base part continuous with a side wall and a single inner fill space, the injection molded container so dimensioned by the two-part mold, the injection molded container having outer dimensions that include a cross-sectional diameter or width in a range of about 15.0 inches to about 25.0 inches, an overall height in a range of about 5.0 inches to about 25.0 inches and a wall thickness of the side wall in a range of about 0.070 inches to about 0.150 inches,
    such that the injection molded container is formed-directly from the two-part mold defining all of the base part and the side wall of said molded container;
    the blow molding grade resin material being a high density polyethylene resin having a melt index in a range of about 0.7 to 1.0 g/10 min. and a density in a range of about 0.958 to about 0.965 g/cc, and
    a combination of said blow molding grade resin material and the injection molded container molded from only the two-part mold using said injection molding machine provides the injection molded container as a thin walled injection molded container having said dimensions when molded.

11. The container of claim 10 wherein:
the blow molding grade resin material is injected into said two-part mold at a temperature in a range of about 570° F. to about 670° F.

12. The container of claim 10 wherein:
the blow molding grade resin material is injected into said two-part mold at a pressure in a range of about 2000 psig to about 2300 psig.

13. The container of claim 10 wherein:
the blow molding grade resin material is injected at a velocity in a range of about 3.8 inches per second to about 4.0 inches per second.

14. The container of claim 10 wherein:
the blow molding grade resin material is injected at a cavity pressure of said two-part mold in a range of 20,000 psig to 27,000 psig.

15. A method of molding a thin walled injection molded container comprising:
injecting into a two-part mold using an injection molding machine a blow molding grade high density polyethylene (HDPE) resin in melt form, the two-part mold defining said thin walled injection molded container, the blow molding grade HDPE resin having a melt index in a range of about 0.7 to 1.0 g/10 min,
such that a combination of said blow molding grade HDPE resin and injecting into said two-part mold provides the thin walled injection molded container that when formed has a wall thickness in a range of about 0.070 inches to less than 0.150 inches.

16. The method of claim 15 wherein:
the density of the blow molding grade HDPE resin is in a range of 0.958 to 0.965 g/cc.

17. The method of claim 15 wherein:
the blow molding grade HDPE resin is injected into said two-part mold at a temperature in a range of 570° F. to 670° F.

18. The method of claim 15 wherein:
the blow molding grade HDPE resin is injected into said two-part mold at a pressure in a range of 2000 psig to 2300 psig.

19. The method of claim 15 wherein:
the blow molding grade HDPE resin is injected at a velocity in a range of 3.8 inches per second to 4.0 inches per second.

20. The method of claim 15 wherein:
the blow molding grade HDPE resin is injected at a cavity pressure of said two-part mold in a range of 20,000 psig to 27,000 psig.

* * * * *